(12) United States Patent
Gocht et al.

(10) Patent No.: US 6,289,109 B1
(45) Date of Patent: *Sep. 11, 2001

(54) METHOD AND APPARATUS FOR PROCESSING MAILPIECES INCLUDING MEANS FOR IDENTIFYING THE LOCATION AND CONTENT OF DATA BLOCKS THEREON

(75) Inventors: Ronald E. Gocht, Manchester; Leon A. Pintsov, W. Hartford, both of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/174,901

(22) Filed: Dec. 29, 1993

(51) Int. Cl.$^7$ .................................................. G06K 9/00
(52) U.S. Cl. ................................ 382/101; 382/177
(58) Field of Search ........................... 382/48, 9, 1, 101, 382/102, 177, 180, 204

(56) References Cited

U.S. PATENT DOCUMENTS

| | | | |
|---|---|---|---|
| 4,516,265 | * 5/1985 | Kizu et al. | 382/102 |
| 4,782,238 | * 11/1988 | Radl et al. | 250/559.36 |
| 5,129,012 | * 7/1992 | Abe | 382/204 |
| 5,293,429 | * 3/1994 | Pizano et al. | 382/202 |

OTHER PUBLICATIONS

Gonzalez et al. *Digital Image Processing*, Addison–Wesley Publishing Co., 1977, pp. 347–348.*

* cited by examiner

*Primary Examiner*—Jon Chang
(74) *Attorney, Agent, or Firm*—Christopher J. Capelli; David E. Pitchenik; Michael E. Melton (57) ABSTRACT

An apparatus for determining the location and content of data blocks on a mailpiece includes a computer connected to a structure for obtaining a digital bit map image of an outer surface of a mailpiece. The computer includes structure programmed for: finding each run of a plurality of black bits of each scan line of the bit map image and determining if any bit thereof neighbors at least one black bit of another scan line; combining the found run with each neighboring bit to form a piece; assigning a descriptive value to a block having at least one piece and comparing the descriptive value to a list of values to determine which type of data block the block having the descriptive value is.

10 Claims, 6 Drawing Sheets

| CONTROL CIRCUITS A | PROGRAM COUNTER B | WORKING REGISTERS C | ARITHMETIC LOGIC UNIT D | OSCILLATOR AND CLOCK E | DATA MEMORY F | K SERIAL AND OTHER PROGRAMMABLE PORTS |
|---|---|---|---|---|---|---|
| TIMER AND EVENT COUNTER G | PROGRAM EXPANSION CONTROL H | MAIN LINE PROGRAM MEMORY I | | | SPARE REGISTERS J | |

MAIN LINE PROGRAM MEMORY I

INCLUDING CIRCUITS PROGRAMMED FOR: INITIALIZATION; CONTROLLING IMAGING STRUCTURE 24 TO UNIDIRECTIONALLY RASTER SCAN EACH MAILPIECE OUTER SURFACE 16; CONTROLLING PRINTING STRUCTURE 32; ASSIGNING AND STORING FIRST, X-AXIS, COORDINATE CODES 81 TO EACH SCAN LINE 80, SEQUENTIALLY FROM THE MAILPIECE LEADING TO TRAILING EDGES, 46 TO 48, AND ASSIGNING AND STORING SECOND, Y-AXIS COORDINATE CODES 83 TO EACH PIXEL 82 OF EACH SCAN LINE 80, SEQUENTIALLY FROM THE MAILPIECE UPPER TO LOWER EDGES, 42 TO 44, FOR PROVIDING A BIT MAPPED IMAGE OF MAILPIECE OUTER SURFACE 16; STORING X-Y COORDINATE CODES, 81, 83, IDENTIFYING PREDETERMINED BOUNDARIES OF THE ADDRESSOR, ADDRESSEE, POSTAL REVENUE, ROUTING, POSTAL AUTOMATION AND ADVERTISER DATA BLOCKS, 60, 70; DETERMINING WHETHER LAST SCAN LINE OF A BIT MAPPED IMAGE HAS BEEN FETCHED; FETCHING NEXT SCAN LINE; DETERMINING WHETHER ANY SCAN LINE INCLUDES A BLACK RUN; DETERMINING WHETHER ANY FOUND BLACK RUN ADJOINS A PRIOR RUN; STARTING A DIFFERENT NEW PIECE IN PROGRESS FOR EACH FOUND RUN NOT ADJOINING A BLACK RUN; APPENDING FOUND RUNS TO ADJOINING RUNS; DETERMINING WHETHER NON-BLACK BITS ADJOIN ANY PRIOR BLACK RUNS; ENDING PIECES IN PROGRESS IF SOLELY NON-BLACK BITS ADJOIN ALL BLACK RUNS THEREOF; DETERMINING WHETHER LAST ENDED BLACK PIECE HAS BEEN FETCHED FOR ANALYSIS; FETCHING NEXT ENDED PIECE NOT PREVIOUSLY FETCHED; DETERMINING WHETHER PIECE SIZE IS ACCEPTABLE AND DISCARDING THOSE THAT ARE NOT; DETERMINING WHETHER ACCEPTABLY-SIZED PIECE SHOULD BE APPENDED TO LINE IN PROGRESS AND STARTING A NEW LINE IF IT IS NOT; APPENDING PIECE IN PROGRESS TO LINE IN PROGRESS IF IT CAN BE APPENDED; IF LAST SCAN LINE OF BIT MAPPED IMAGE HAS BEEN FETCHED, THEN, FETCHING AND DETERMINING LOCATION COORDINATES OF A BLOCK OF LINES NOT PREVIOUSLY FETCHED AND ASSIGNING WEIGHTED VALUE THERETO; COMPARING LINE-BLOCK VALUE TO A LIST OF DATA BLOCK VALUES IDENTIFYING LOCATION OF PLURALITY OF DATA BLOCKS; IDENTIFYING THE FETCHED LINE BLOCK AS PARTICULAR DATA BLOCK ON THE BASIS OF COMPARING THE VALUES; DETERMINING WHETHER ALL LINE BLOCKS HAVE BEEN IDENTIFIED AS THE DATA BLOCKS; AND CONTINUOUSLY LOOPING THROUGH PROCESSING UNTIL ALL LINE BLOCKS ARE IDENTIFIED AS DATA BLOCKS. IN ADDITION, CIRCUITRY IS PROGRAMMED FOR IMPLEMENTING ANY AND ALL STEPS DISCUSSED IN THE SPECIFICATION, OR WHICH MAY BE CONVENTIONALLY REQUIRED FOR IMPLEMENTATION THEREOF OR ANY OF THE AFORESAID PROGRAMMING.

| KEYBOARD M | DISPLAY N |
|---|---|

METHOD AND APPARATUS FOR PROCESSING MAILPIECES INCLUDING MEANS FOR IDENTIFYING THE LOCATION AND CONTENT OF DATA BLOCKS THEREON

BACKGROUND OF THE INVENTION

This invention is generally concerned with methods and apparatus for processing mailpieces, and more particularly with such methods and apparatus which include means for identifying the location and content of data thereon.

In recent years, postal services throughout the world have been making greater and greater demands upon mailers to conform to prescribed standards for locating different types of information on mailpieces, including, for example, locating data blocks corresponding to information concerning the addressee, addressor and postage value paid or to be paid, and mailpiece processing data including, for example, bar-coded sorting data. Additional standards are being set which dictate the format and content of such data blocks, including, for example, the format and data content of information pertaining to the class of mailing service, identity of each mailpiece of a batch including the number of mailpieces thereof, and the time of preparation and other accounting data. In general, such standards tend to shift at least some of the mailpiece processing burden, historically carried by the postal services, to the mailers, and otherwise enhance the capacity of postal services to rapidly process and deliver mailpieces. Accordingly, there is a worldwide trend amongst postal services to make worksharing demands on their mailing customers to produce mailpieces which can be more efficiently and cost effectively processed when delivered to the postal services.

Although considerable progress has been made in developing postal processing systems technologies, including, for example, optical character recognition and video imaging technologies, the vast majority of such technologies are either aimed at mail processing in a postal environment or are derivatives thereof. As a result, available systems suffer from two important shortcomings, insofar as mailers are concerned. First, they have been designed to process a wide variety of mailpieces at very high speeds, and are therefore overly sophisticated for processing relatively small volumes of standardized mailpieces. And, second, due to the large volume of mailpieces which must be processed by such systems, they must be robustly constructed to withstand long term wear and tear, with the result that their cost of manufacture and maintenance is prohibitively high for use by commercial mailers. Moreover, since the available systems have been designed to print data in accordance with postal service demands, and the majority of commercial mailers are also concerned with marking mailpiece with useful commercial data not demanded by postal services, available systems may or may not be adaptable for use in commercial applications.

With the above thoughts in mind, it has been concluded that there is a need for a simply constructed, low cost, mailpiece-processing, system, which includes structure for locating and interpreting the content of data blocks of mailpiece images at moderate speeds in a non-postal service, ie., mailer's, environment. Accordingly:

an object of the invention is to provide a low cost system for processing mailpieces;

and another object is to provide a low cost system for processing and interpreting the content of data blocks of variable information on mailpieces.

SUMMARY OF THE INVENTION

Apparatus for processing mailpieces comprising: means for sequentially feeding a plurality of mailpieces in a predetermined path of travel having a downstream direction, each of the mailpieces having a leading edge and a trailing edge in the path of travel, each of the mailpieces including an outer surface having a plurality of blocks of data marked thereon, each of the mailpiece outer surfaces having a longitudinal length thereof extending upstream from the leading to the trailing edge thereof and having a transverse length thereof extending transversely of the longitudinal length; a digital computer; means electrically connected to the computer for obtaining a digital bit map image of the outer surface of at least one of the mailpieces, the image obtaining means including means for unidirectionally raster scanning the mailpiece outer surface under the control of the computer, the image obtaining means including means for sequentially providing a plurality of scan lines of data to the computer, the scan lines respectively extending parallel to one another and transversely of the longitudinal length of the mailpiece outer surface, each of the scan lines including a sequence of a plurality of pixels of data respectively corresponding to a bit of a black and white scale of bits, each of the scan lines having a different first coordinate code assigned thereto for identifying a location thereof longitudinally of the length of the mailpiece outer surface, each of the pixels of any given scan line having a different second coordinate code assigned thereto for identifying a location thereof transversely of the longitudinal length of the mailpiece outer surface, whereby each pixel has a different combination of first and second coordinate codes uniquely identifying the location thereof on the mailpiece outer surface and all of the pixels correspond to a bit map image thereof; and the computer including means programmed for: finding each run of a plurality of black bits of each scan line and determining whether any bit thereof neighbors at least one black bit of another scan line; combining each of the found runs of each scan line with each neighboring black bit of the another scan line to form at least one piece; determining the first and second coordinates defining a location on the mailpiece outer surface of a block of at least one piece and assigning a descriptive value thereto as a function of a plurality of features thereof; and comparing the descriptive value assigned to the block of at least one piece to a list of values identifying the location of a plurality of blocks of data and identifying the block of at least one piece as a particular one of the plurality of blocks of data if the values compare.

BRIEF DESCRIPTION OF THE DRAWINGS

As shown the drawings were in like reference represent like or corresponding parts throughout the several views:

FIG. 3 is a block diagram of a personal computer according to the invention;

DESCRIPTION OF THE PREFERRED EMBODIMENTS

Figure 1:
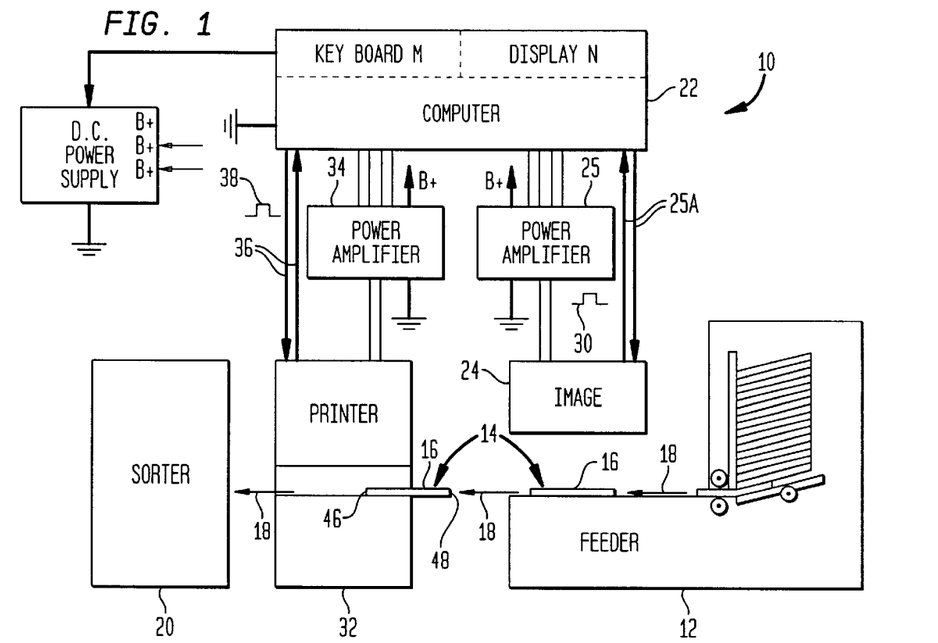
FIG. 1 is a schematic, block, diagram of an apparatus for processing mailpieces according to the invention.

As shown in FIG. 1, the mail processing apparatus 10, according to the invention, generally includes conventional structure 12 for sequentially feeding a plurality of mailpieces 14, each having a relevant outer surface 16 thereof oriented for scanning purposes, in a downstream-extending path of travel 18. The apparatus 10 may also include additional components, including any conventional mailpiece processing structure, represented by the structure 20, for example, for sorting the mailpieces 14. In addition, the apparatus 10 includes a digital computer 22 which is preferably a personal computer, and imaging structure 24 which is conventionally electrically connected to the computer 22 for control thereby, as by means of a power amplifier 25 therebetween and control leads 25a. The imaging structure 24 is preferably operatively associated with the feeding structure 12 for sequentially unidirectionally raster scanning the mailpiece outer surfaces 16, in the path of travel 18, and providing signals corresponding thereto, such as the signal 30, to the computer 22. Moreover, the apparatus 10 includes printing structure 32, located downstream from the feeding structure 12, which is conventionally electrically connected to the computer 22 for control thereby, as by means of a power amplifier 34 therebetween and control leads 36. The printing structure 32 is preferably provided for printing postal automation data, such as a bar code, on each of the mailpieces 14 in the path of travel 18, in response to signals corresponding thereto, such as the signal 38, received from the computer 22.

Figure 2:
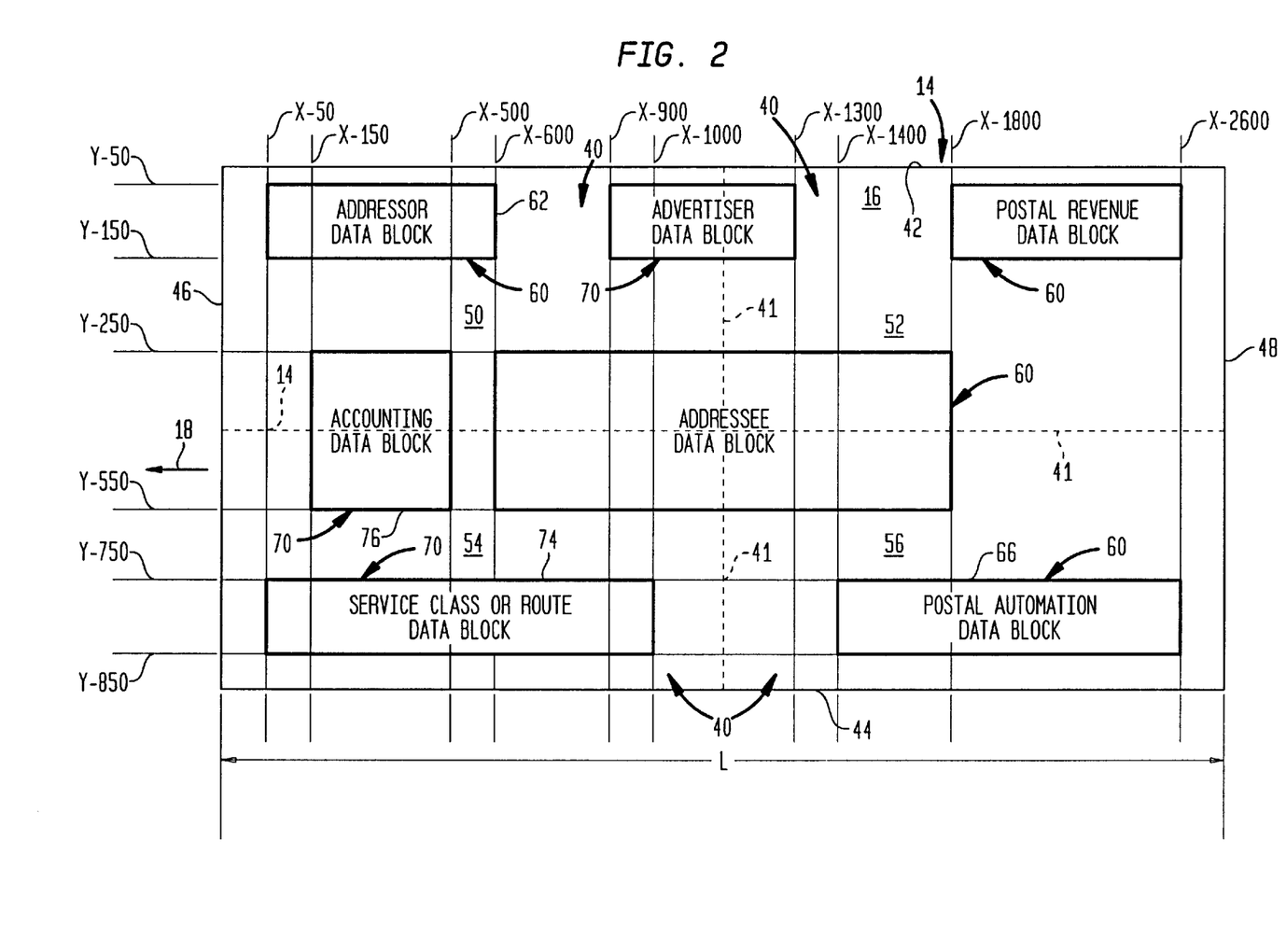
FIG. 2 is a schematic diagram of a typical mailpiece of FIG. 1 which may be processed by the apparatus thereof.

As shown in FIG. 2, for discussion purposes it is noted that the relevant outer surface 16 of a typical mailpiece 14 may be divided into four quadrants 40, defined in part by the dashed lines 41. And, the outer surface 16 has opposed upper and lower edges, 42 and 44, respectively, and opposed left and right edges, 46 and 48, respectively. The upper and left edges, 42 and 46, and dashed lines 41 define an upper left quadrant area 50. The upper and right edges, 42 and 48, and dashed lines 41 define an upper right quadrant area 52. The lower and left edges, 44 and 46, and dashed lines 41 define a lower left quadrant area 54. And, the lower and right edges, 44 and 48, and dashed lines 41 define a lower right quadrant area 56.

As further shown in FIG. 2, the mailpiece outer surface 16 includes a plurality of data blocks 60 which are typically required by the majority of postal services, and may also include an additional plurality of optional data blocks 70 which have been typically added by either a mailer or postal service. Each of required data blocks 60 is located in a particular area on the mailpiece's outer surface 16 in accordance with presently applicable postal service standards. The data blocks 60 required by the postal service include an origination address, or addressor, data block 62, which is typically located in the upper left quadrant area 50, a postal revenue data block 64, which is typically located in the upper right quadrant area 52, a postal automation data block 66, which is typically located in the lower right quadrant area 56, and a destination address, or addressee, data block 68, which is typically located, at least in part, substantially centrally of the outer surface 16, or, otherwise stated, in overlapping relationship with each of the quadrant areas, 50, 52, 54 and 56, and substantially midway between the upper and lower edges, 42 and 44. The optional data blocks 70, may or alternatively include a first data block 72, which may typically include a mailer or postal service advertising emblem or slogan located between the addressor and postal revenue data blocks, 62 and 64, and alongside the upper edge 40. The optional data blocks 70 may also or alternatively include a second data block 74, which may typically include a postal service class of service notation, such as "Air Mail" or a mailer's routing notation, such as "ATTN: Attorney Brigitte L. Jeffrey", located in the lower left quadrant area 54. And, the optional data blocks 70 may also or alternatively include a third data block 76, which may typically include a mailer's accounting notation, such as batch mail data, located between the addressor and second data blocks, 62 and 74, and to the left of the addressee data block 68.

As shown in FIG. 3, the computer 22 generally comprises a plurality of discrete circuits, including those for a central processing unit, including a plurality of control circuits "A", a program counter "B", a plurality of working registers "C" and an arithmetic logic unit "D", and those for an oscillator and clock "E", data memory "F", timer and event counters "G" and program expansion control "H". Further, the computer 22 comprises a plurality of additional discrete circuits including those for a plurality of program memories, including a main line program memory "I". Moreover, the computer 22 preferably includes a plurality of spare registers "J" for future use as working registers or for future programming. In addition, the computer 22 includes a plurality of serial and other programmable ports "K" which are conventionally interconnected as hereinbefore discussed to the imaging and printing structures 24 and 32. And, the computer 22 preferably includes a conventional keyboard "M" and display "N" for interfacing with an operator of the apparatus 10.

Figure 4:
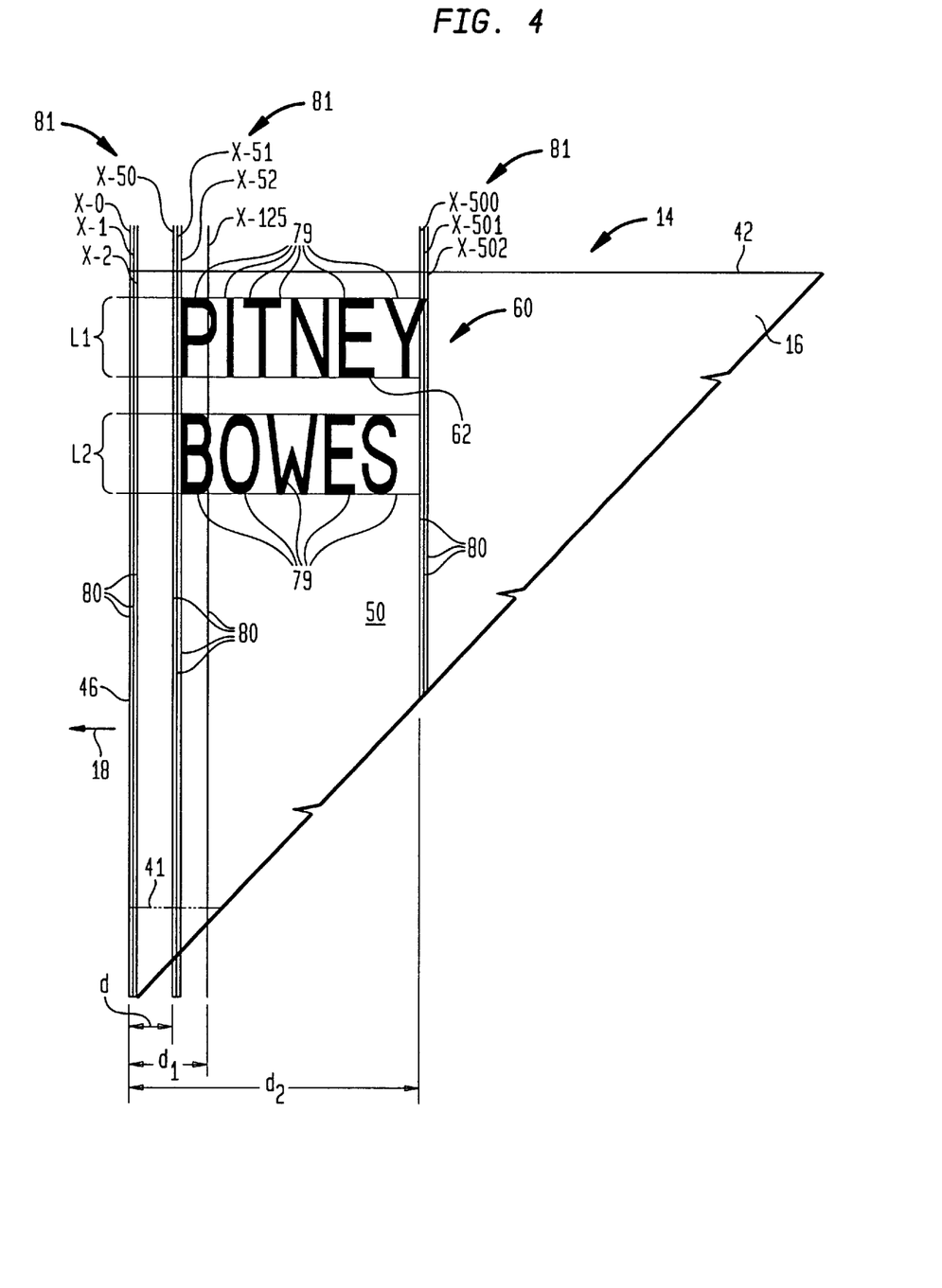
FIG. 4 is schematic diagram of an enlarged portion of the mailpiece of FIG. 2 showing details of an exemplary addressor data block and a plurality of scan lines resulting from unidirectionally raster scanning the mailpiece.

FIG. 4 portrays a portion of the upper left quadrant 50 of the typical mailpiece 14 (FIG. 2), wherein the addressor data block 62 includes a plurality of block printed characters 79 of the name "PITNEY BOWES" (FIG. 4), set forth in two lines of characters, respectively designated "L1" and "L2", extending along the longitudinal length "L" (FIG. 2) of the mailpiece outer surface 16. According to the invention, each of the block printed characters 79 (FIG. 4) of each line, L1, L2, thereof will hereinafter be referred to as a "disjoint" piece, or piece 79, since it is separated from all other pieces 79 of any given line. Moreover, FIG. 4 portrays a plurality of scan lines 80, extending transversely of the longitudinal length "L" (FIG. 2) of the mailpiece outer surface 16. For implementation of the invention, the circuits of the main line program memory "I" are conventionally programmed for causing the imaging structure 24 (FIG. 1) to unidirectionally raster scan the mailpiece outer surface 16 (FIG. 4) at a predetermined scan rate of, for example, 200 lines per inch. Moreover, the circuits of the main line program memory "I" are conventionally programmed for causing each of the scan lines 80, which respectively extend parallel to one another, to have assigned thereto and stored in the data memory "F" a different first, or "X"-axis, coordinate code 81 to sequentially identify a relative location thereof, longitudinally of the length "L" of the mailpiece outer surface 16 (FIG. 2), from the leading edge 46 of the mailpiece 14 as the mailpiece 14 is fed downstream in the path of travel 18. Thus the first, second and third scan lines 80 (FIG. 4) from the leading edge 46 of the mailpiece 14 are sequentially assigned the X-axis, coordinate, codes 81 of X-0, X-1, and X-2, and the remainder of the scan lines 80 are sequentially assigned X-axis coordinate codes 81 commencing with the code X-3 and ending with the code X-n, where "n" is the number of the X-axis coordinate code 81 bordering the trailing edge 48

(FIG. 2) of the mailpiece 16. For example, although FIG. 4 is not drawn to scale, assuming the scan rate of 200 lines per inch for discussion purposes, the fourth scan line 80 from the leading edge 46 is assigned the X-axis, coordinate code X-75, it being noted that the fourth scan line 80 is separated from the leading edge 46 by a distance "$d_2$" of approximately three-eighths of an inch (3/8"), and, the next two scan lines 80 to the right of line X-75 are respectively sequentially assigned the X-axis coordinate codes X-76 and X-77. Similarly, since the seventh scan line 80 is located a distance "$d_1$" of approximately five-eighths of an inch (5/8") from the leading edge 46, the seventh scan line 80 is assigned the X-axis, coordinate code X-125. Moreover, since the eighth scan line 80 from the leading edge 45 is separated therefrom by a distance "$d^2$" of approximately two and one-half inches (2½"), the eighth scan line has been assigned the X-axis coordinate code X-500, and, the next two scan lines 80 to the right thereof are respectively sequentially assigned the X-axis, coordinate codes X-501 and X-502.

Figure 5:
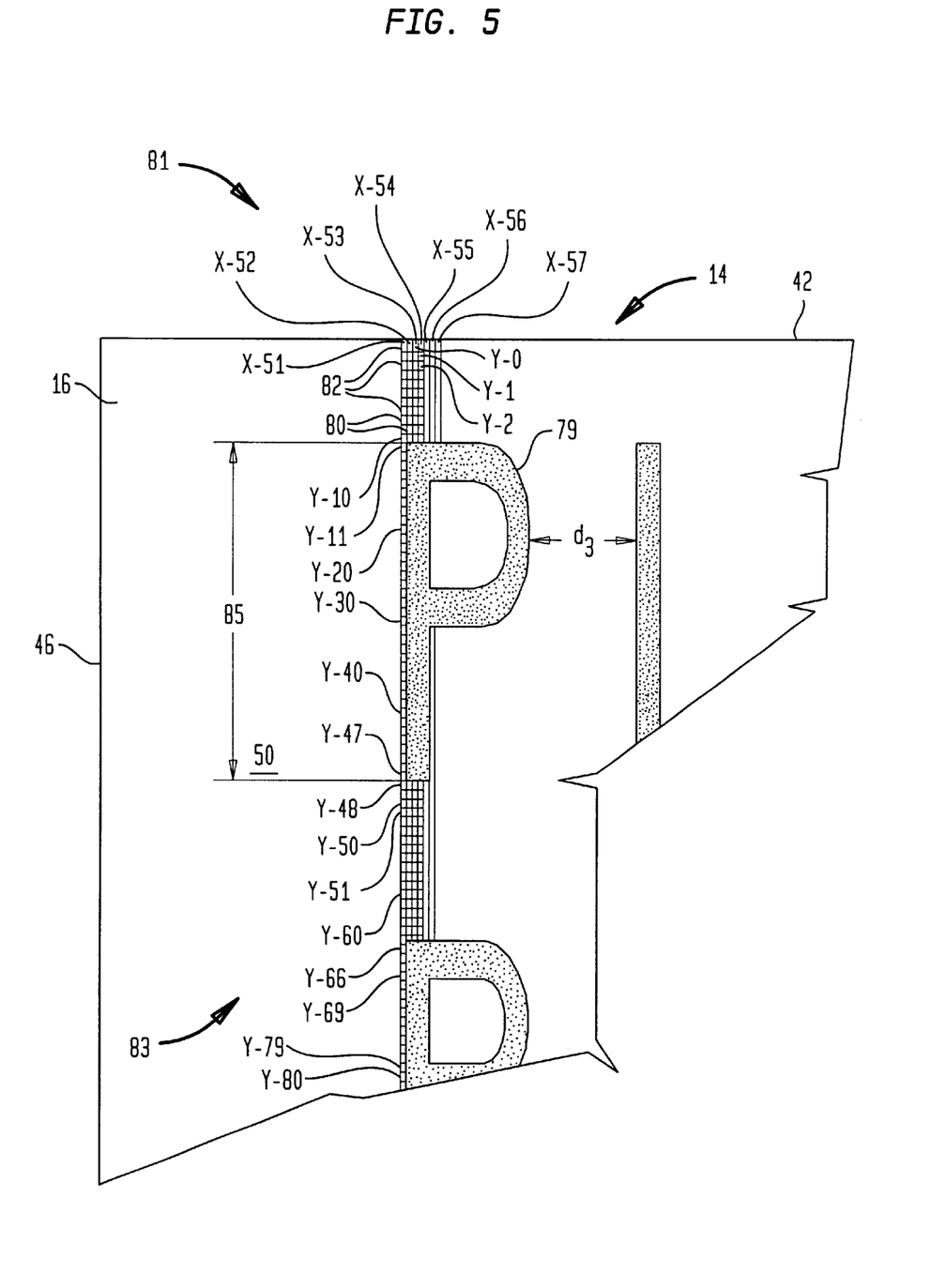
FIG. 5 is an enlarged portion of the mailpiece portion shown in FIG. 4.

FIG. 5 portrays an enlarged portion of the upper left quadrant 50 of the mailpiece 16 shown as FIG. 4, including the block printed character "P", a portion of the block printed character "I" and a portion of the block printed character "B". As shown in FIG. 5, each of the scan lines 80 includes, as illustrated by those having the X-axis coordinate codes X-51, X-52, X-53, X-54 and X-55, a sequence of a plurality of pixels 82 of data, respectively corresponding to a bit of a black and white scale of bits. For implementation of the invention, the circuits of the main line program memory "I" are conventionally programmed for causing the data pixels 82 of any given scan line 80 to each have assigned thereto a different second, or Y-axis, coordinate code 83, to sequentially identify a relative location thereof, transversely of the longitudinal length "L" (FIG. 2) of the mailpiece outer surface 16, from the upper edge 42 as the mailpiece 14 is fed downstream in the path of travel 18. Thus, in any given scan line 80, the first, second and third pixels 82 (FIG. 5) from the mailpiece upper edge 42 are sequentially assigned the Y-axis coordinate codes 83 of Y-0, Y-1 and Y-2, and the remainder of the pixels 82 of any given scan line 80 are sequentially assigned Y-axis coordinate codes 83 commencing with the code Y-3 and ending with the code Y-n where "n" is the number of the Y-axis coordinate code 83 bordering the lower edge 44 (FIG. 2) of the mailpiece 16. For example, although FIG. 5 is not drawn to scale, assuming 200 pixels per inch of scan line for discussion purposes, the portion of the scan line 80 having the Y-axis coordinate code 83 of Y-51 includes eighty-one (81) white pixels having the Y-axis coordinate codes Y-0 through Y-80 inclusive. Similarly, the portion of the scan line 80 having the X-axis coordinate codes 83 of X-52 includes eleven (11) white pixels 82 sequentially assigned the Y-axis coordinate codes 83 of Y-0 through Y-10 inclusive, followed by thirty-seven (37) black pixels 82 sequentially assigned the Y-axis coordinate codes 83 of Y-11 through Y-47 inclusive, followed by nineteen white pixels 82 sequentially assigned the Y-axis coordinate codes 83 of Y-48 through Y-66 inclusive, and followed by thirteen (13) black pixels 82 sequentially assigned the Y-axis coordinate codes 83 of Y-67 through Y-79 inclusive. According to the invention, any given sequence of pixels 82 of a given scan line 80 which includes only black bits of information will be referred to as a run 85 of black bits of the given scan line 80. Thus the above discussed scan line encoded X-52 includes a run 85 of thirty-seven (37) black bits assigned the Y-axis coordinate codes 83 of Y-11 through Y-66 inclusive, and a run 85 of thirteen (13) black bits assigned the Y-axis coordinate codes 83 of Y-67 through Y-79 inclusive.

Figure 6:
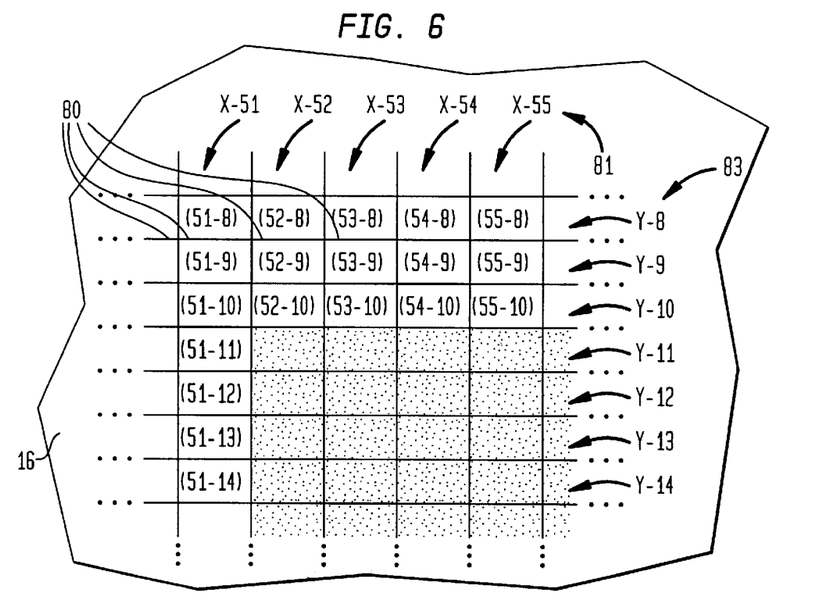
FIG. 6 is an enlarged portion of the mailpiece portion shown in FIG. 5.

FIG. 6 portrays an enlarged portion of an upper left portion of the mailpiece 14 shown in FIG. 5, including a portion of the printed character "P". As shown in FIG. 6, each of the pixels 82 has a different X-Y coordinate code assigned thereto, such as the code "(53-9)" assigned to the pixel 82 located in the scan line encoded X-53 at pixel location encoded Y-9. According to the invention each of the pixels 82 adjoining any given pixel 82, such as the pixel 82 having the X-Y coordinate codes 81, 83, of (53-9), is hereinafter referred to as a neighboring pixel. Thus the neighboring pixels 82 of the pixel encoded (53-9) are the pixels encoded (52-8), (52-9), (52-10), (53-8), (53-10), (54-8), (54-9) and (54-10). Similarly the neighboring pixels 82 of the pixel 82 having the X-Y coordinate codes 81, 83 of (53-10), are the pixels 82 encoded (52-9), (52-10), (52-11), (53-9), (53-11), (54-9), (54-10) and (54-11), and so on. Further, as shown in FIG. 5, the block printed character "P", or piece 79, comprises a plurality of runs 85 of black bits. For example, the black-bit run 85 having the X-Y coordinate codes, 81, 83, of (52-11) through (52-47) inclusive and black-bit run 85 having the X-Y coordinate codes, 81, 83 of (53-11) through (53-47) inclusive, each neighbor at least one black bit for example, the black bit encoded (53-11), or black bit encoded (54-11), of another scan line 80. Moreover, according to the invention, each piece 79 (FIG. 4) of any given line, exemplified by the lines L1, L2, is preferably separated from any other piece 79 in the same given line, e.g., L1 or L2 by a predetermined minimum acceptable distance "$d_3$" (FIG. 5) of, for example, 0.25 inches.

In addition, as shown in FIG. 2 the location on the mailpiece outer surface 16 of each of the data blocks, 60, 70, is preferably defined in terms of the X-Y coordinate codes, 81, 83, of the outer boundaries thereof. For example, the addressor data block 62 is bounded by the scan lines encoded X-50 and X-600, and by the pixels encoded X-50 and X-150; whereas the addressee data block 62 is bounded by the scan lines encoded X-600 and X-1800, and by the pixels encoded X-50 and X-150; whereas the addressee data block is bounded by the scan lines encoded X-600 and X-1800, and by the pixels encoded X-250 and X-550; and so on. And, according to the invention the computer data memory "F" has stored therein a list of predetermined coordinate codes, 81, 83, identifying a predetermined, expected, location of each of the data blocks, 60, 70, on the typical mailpiece outer surface 16. Further, the circuits of the main line program memory "I" are programmed as hereinafter discussed for identifying the actual location and content of the data blocks, 60, 70, on respective mailpiece outer surfaces 16 as such mailpieces 14 are fed downstream in the path of travel 18.

Figure 7:
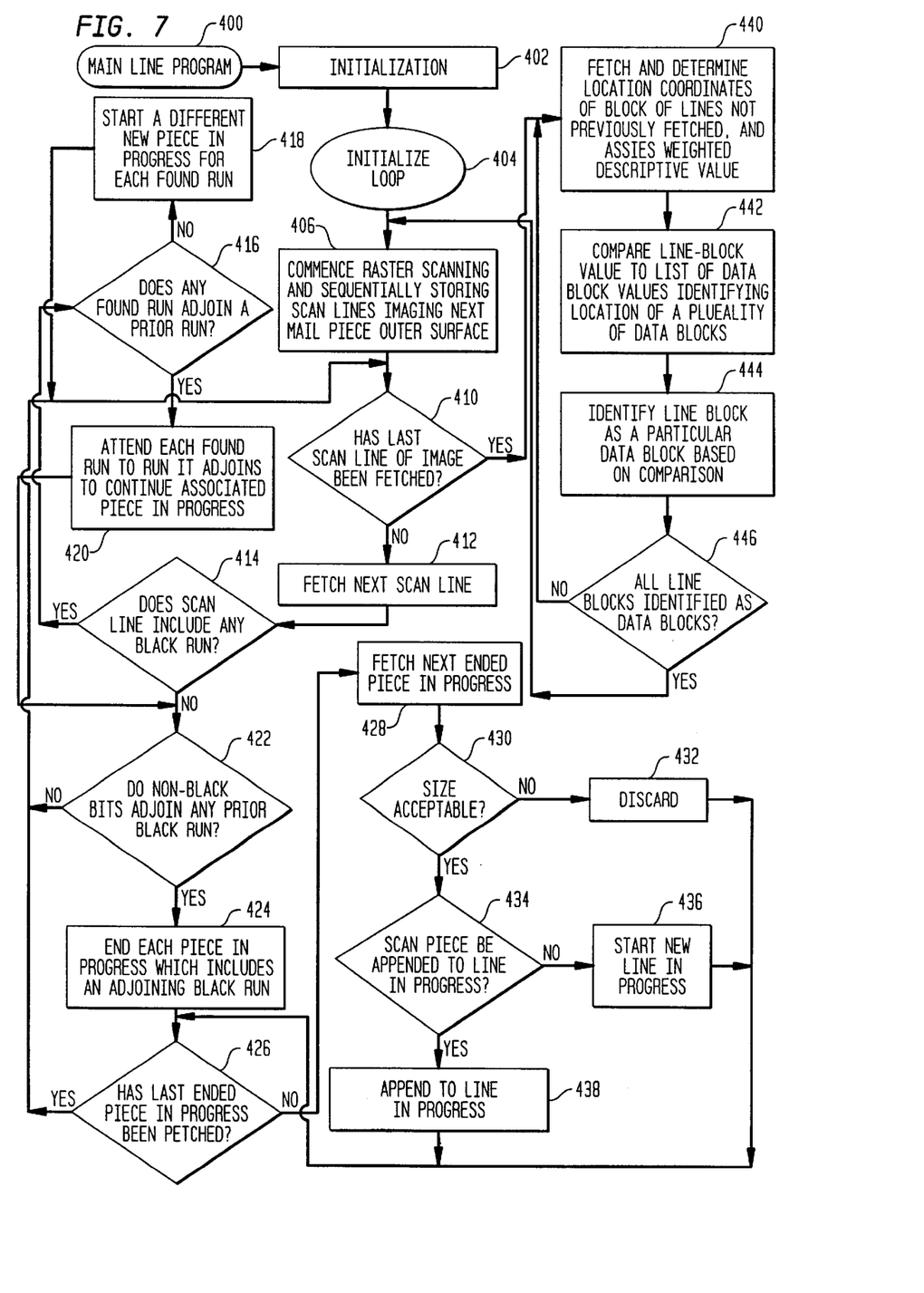
FIG. 7 is a flow chart of the processes implemented by the computer of FIG. 3.

For implementation of the invention, the main line program 400 (FIG. 7), which is stored in the circuits of the main line program memory "I" (FIG. 3), commences with the step 402 (FIG. 7) of conventionally initializing the computer 22 (FIG. 2), which generally includes establishing the initial voltage levels at the programmable ports "K" (FIG. 3) setting the timer and event counters "G" and, if necessary, initializing the imaging and printing structures, 24 and 32, for example, as by scanning the programmable ports "K" associated with the imaging and printing structures, 24 and 32, determining whether or not one or more selected elements thereof are properly located for initiating operation thereof, and, if not, causing the imaging and printing structures, 24 and 32, to appropriately locate such elements.

Assuming completion of the initialization step 402 (FIG. 7), the main line program 400 cause the computer 22 to implement the step 404 of initializing a loop routine. In the loop routine, step 404, the program 400 initially causes the computer 22 to implement the step 406 of causing the imaging structure 24 to unidirectionally raster scan, and to sequentially assign and store in the computer's data memory "F", X-axis coordinate codes 81 for each successive scan line. Of course, if the next mailpiece outer surface 16 is the first, rather than a subsequent, mailpiece outer surface 16, then, step 406 would initially be implemented respecting the first mailpiece outer surface 16. As the raster scanning of step 406 proceeds, the program 400 concurrently causes the computer 22 to implement the step 410 of determining whether the last scan line of the image stored in the course of implementation of step 406 has been fetched for analysis as hereinafter discussed. Assuming at this juncture that the last scan line has not been fetched, step 410, then, the program 400 causes the computer 22 to implement the step 412 of fetching the next scan line not previously fetched, followed by the step 414 determining whether the scan line includes one or more runs 85 of black bits, for example by identifying and storing in the computer data memory "F" sequential transition counts of the fetched scan line to identify each of the runs 85 of black bits of the fetched scan line. Assuming, the fetched scan line includes one or more runs 85 of black bits, step 414, then, the program 400 causes the computer 22 to implement the step 416 of determining whether any of the one or more found runs 85 of black bits adjoins a run 85 of black bits of a prior scan line. For example, as shown in FIG. 5, assuming the fetched scan line 80 is line X-53, the fetched line 80 includes a run 85 of black bits extending from pixel location Y-11 to pixel location Y-47, and another run 85 of black bits extending from pixel location Y-67. And, each of such runs 85 adjoins the corresponding black bit run 85 of scan line Y-52. On the other hand, assuming the fetched scan line 80 is line X-52, the aforesaid runs 85 do not adjoin corresponding runs 85 in scan line X-51. Referring back to FIG. 7, and to step 416, assuming the inquiry thereof is affirmatively answered, that is, one or more of the found runs 85 do not adjoin a run 85 of a prior scan line, then, with respect to each run 85 that does not adjoin a prior run 85, the program 400 causes the computer 22 to implement the step 418 of commencing a different new piece 79 in progress, followed by returning processing to step 410. On the other hand, with regard to any found black run 85 which does adjoin a prior black run 85, step 416, then, the program 400 causes the computer 22 to implement the step 420 of appending each of such found runs 85 to the prior run 85 it adjoins to continue, in each instance, a previously started piece 79 in progress. Referring back to step 414, and assuming that the fetched scan line 85 does not include any black run 85, or, after implementing the step 420 of appending each found run 85 to a prior adjoining run 85, the program 400 causes the computer 22 to implement the step 422 of determining whether any of the non-black bits of the fetched scan line 80 adjoin any prior black run 85. For example, as shown in FIG. 4, the scan line 80 encoded X-502 includes non-black bits which adjoin a run 85 (FIG. 5) of black bits of the scan line 80 (FIG. 4) encoded X-501 defining a portion of the piece 79 consisting of the character "Y". Assuming the inquiry of step 422 (FIG. 7) is affirmatively answered, then, the program 400 causes the computer 22 to implement the step 422 of ending each piece 79 in progress which includes an adjoining black run 85; whereas if the inquiry of step 422 is negatively answered, processing is returned to step 410. Thereafter, the program 400 causes the computer 22 to implement the step 426 of determining whether the last ended piece 79 in progress has been fetched for subsequent analysis as hereinafter discussed. Assuming that the last ended piece 79 in progress has been fetched, step 416, then, processing is returned to step 410. If however the last ended piece 79 in progress has not been fetched, step 426, then the program 400 causes the computer 22 to implement the step 428 of fetching the next ended piece 79 in progress which was not previously been fetched, followed by the step 430 of determining whether the size of the found black piece 79 is acceptable. Step 430 preferably includes implementation of the steps, in any order, of determining whether the found black piece 79 is either so small or so large that it cannot be a printed character. For example, a printed character may be found to be unacceptable due to not being of a size which is equal to or greater than eight (8) points and not greater than twenty-four (24) points. Assuming the answer to step 430 is determined to be negative, i.e., the found piece 79 is not of an acceptable size, then, the program 400 causes the computer 22 to implement the step 432 of discarding the found piece, as by erasing the same from the computer memory, followed by returning processing to step 426. On the other hand, assuming the size of the found, disjoint, black piece 79 is determined to be of an acceptable size, step 430, then, the program 400 causes the computer 22 to implement the step 434 of determining whether the found piece may be appended to an existing line, of at least one previously found black piece 79 extending along the longitudinal length of the mailpiece outer surface 16. Assuming the inquiry of step 434 is negatively answered, then, the program 400 causes the computer 22 to implement the step 436 of identifying the found black piece 79 as the first found piece of a new line, e.g., L1 or L2, of characters, followed by returning processing to step 416. If, however, the inquiry of step 434 is affirmatively answered, then, the program 400 causes the computer 22 to implement the step 438 of appending the found black piece 79 to the existing line of piece(s), followed by causing processing to be returned to step 426.

Returning at this juncture to step 410 (FIG. 7), and assuming that the last scan line of the image of the mailpiece outer surface 16 has been fetched, then, the program 400 causes the computer 22 to implement the step 440 of fetching and determining the location coordinates of a not-previously-fetched block of lines of black pieces, and assigning a weighted descriptive value thereto. Step 440 preferably includes implementation of the steps, in any order, of determining one or more or all of various descriptive features of a line block, including, for example, the size of the block of lines, the uniformity of characters in each of the lines, whether or not the left marginal edge of the block of lines is justified, i.e. straight, whether or not the lines are at an angle relative to an edge of the mailpiece outer surface 16, and the location of the block of lines on the mailpiece outer surface; followed by the step of assigning a score or weighted value to the block of lines in consideration of the aforesaid descriptive features. Thereafter, the program 400 causes the computer 22 to implement the step 442 of comparing the weighted descriptive value of the block of lines to a list of data block values identifying the location of each of the required and optional data blocks, 60 and 70, hereinbefore discussed, followed by the step 444 of identifying the block of lines as a particular one of the data blocks of the list thereof. Following step 444, the program 400 preferably causes the computer 22 to implement the step 446 of determining whether all of the blocks of lines of a given mailpiece outer surface 16 have been identified. Assuming that they have not, processing is returned to step 440. If, however, all of the mailpiece outer surface blocks of lines have been identified as data blocks, step 446, then, the program 400 causes the computer 22 to return processing to step 406.

What is claimed is:

1. Apparatus for processing mailpieces comprising:
   a. means for sequentially feeding a plurality of mailpieces in a predetermined path of travel having a downstream direction, each of the mailpiece having a leading edge and a trailing edge in the path of travel, each of the mailpieces including an outer surface having a plurality of blocks of data marked thereon, each of the mailpiece outer surfaces having a longitudinal length thereof extending upstream from the leading to the trailing edge thereof having a transverse length thereof extending transversely of the longitudinal length;
   b. a digital computer;
   c. means electrically connected to the computer for obtaining a digital bit map image of the outer surface of at least one of the mailpieces, the image obtaining means including means for unidirectionally raster scanning the mailpiece outer surface under the control of the computer, the image obtaining means including means for sequentially providing a plurality of scan lines of data to the computer, the scan lines respectively extending parallel to one another and transversely of the longitudinal length of the mailpiece outer surface, each of the scan lines including a sequence of a plurality of pixels of data respectively corresponding to a bit of a black and white scale of bits, each of the scan lines having a different first coordinate code assigned thereto for identifying a location thereof longitudinally of the length of the mailpiece outer surface, each of the pixels of any given scan line having a different second coordinate code assigned thereto for identifying a location thereof transversely of the longitudinal length of the mailpiece outer surface, whereby each pixel has a different combination of first and second coordinate codes uniquely identifying the location thereof on the mailpiece outer surface and all of the pixels correspond to a bit map image thereof; and
   d. the computer including means programmed for:
      i. finding individual runs of a plurality of black bits of each scan line and determining whether any bit of each individual run neighbors at least one black bit of another scan line;
      ii. combining each of the found individual runs of each scan line which neighbor at least one black bit of the another scan line with each neighboring black bit of the another scan line to form at least one character;
      iii. determining the first and second coordinates defining a location on the mailpiece outer surface of a block having at least one character and assigning a descriptive value to the block as a function of a plurality of features thereof; and
      iv. comparing the descriptive value assigned to the block having at lest one character to a list of values identifying the location of a plurality of blocks of data and identifying the block having at least one character as a particular one of the plurality of blocks of data if the descriptive value is the same as one of the values in the list of values.

2. The apparatus according to claim 1, wherein the means for determining whether (a) any bit of each individual run neighbors at least one black bit of the another scan line includes means for determining that a given found individual run should be combined with another found individual run of another scan line to form the at least one character, and said means for determining that the given found individual run should be combined includes means for determining that the at least one character is that of a line extending along the longitudinal length of the mailpiece outer surface.

3. The apparatus according to claim 2, wherein the means for combining includes means determining that the at lest one character should be appended to a previously formed at least one character to form a part of the line if the at least one character is spaced apart from the previously formed at least one character a distance which is less than a predetermined distance.

4. The apparatus according to claim 2, wherein the means for combining includes means for determining that the at least one character should not be appended to a previously formed at least one character to form a part of the line if the at least one character is not spaced apart from the previously formed at least one character a distance which is less than a predetermined distance.

5. The apparatus according to claim 4, wherein the means for combining includes means for starting another line including the at least one character if the at least one character is not appended to the line which includes a previously formed at least one character.

6. In apparatus for processing mailpieces, wherein the apparatus comprises;
   a. means for sequentially feeding a plurality of mailpieces in a predetermined path of travel having a downstream direction, each of the mailpieces having a leading edge and a trailing edge in the path of travel, each of the mailpieces including an outer surface having a plurality of blocks of data marked thereon, each of the mailpiece outer surfaces having a longitudinal length thereof extending upstream from the leading to the trailing edge thereof and having a transverse length thereof extending transversely of the longitudinal length;
   b. a digital computer;
   c. means electrically connected to the computer for obtaining a digital bit map image of the outer surface of at lease one of the mailpieces, the image obtaining means including means for unidirectionally raster scanning the mailpiece outer surface under the control of the computer, the image obtaining means including means for sequentially providing a plurality of scan lines of data to the computer, the scan lines respectively extending parallel to one another and transversely of the longitudinal length of the mailpiece outer surface, each of the scan lines including a sequence of a plurality of pixels of data respectively corresponding to a bit of a black and white scale of bits, each of the scan lines having a different first coordinate code assigned thereto for identifying a location thereof longitudinally of the length of the mailpiece outer surface, each of the pixels of any given scan line having a different second coordinate code assigned thereto for identifying a location thereof transversely of longitudinal length of the mailpice outer surface, whereby each pixel has a different combination of first and second coordinate codes uniquely identifying the location thereof on the mailpiece outer surface and all of the pixels correspond to a bit map image thereof; a process for identifying the location and content of blocks of data on the mailpiece outer surface, the process including the steps of:
      i. finding individual runs of a plurality of back bits of each scan line and determining whether any bit of each individual run neighbors at least one black bit of another scan line;

ii. combining each of the found individual runs of each scan line which neighbors at least one black bit of the another scan line with each neighboring black bit of the another scan line to form at least one character;

iii. determining the first and second coordinates defining a location on the mailpiece outer surface of a block having at least one character and assigning a descriptive value to the block as a function of a plurality of features thereof; and iv. comparing the descriptive value assigned to the block having at least one piece to a list of values identifying the location of a plurality of blocks of data and identifying the block having at least one piece as a particular one of the plurality of blocks of data if the descriptive value is the same as one of the values in the list of values.

7. The process according to claim 6, wherein the step of determining whether any bit of each individual run neighbors at least one black bit of the another scan line includes the step of (1) determining that a given found individual run should be combined with another found individual run of another scan line to form the at least one character and (2) determining that the at least one character is that of a line extending along the longitudinal length of the mailpiece outer surface.

8. The process according to claim 7, wherein the combining step includes the step of determining that the at least one character should be appended to a previously formed at least one character to form a part of the line if the at least one character is spaced apart from the previously formed at least one character a distance which is less than a predetermined distance.

9. The process according to claim 7, wherein the combining step includes the step of determining that the at least one character should not be appended to a previously formed at least one character to form a part of the line if the at least one character is not spaced apart from the previously formed at least one character a distance which is less than a predetermined distance.

10. The process according to claim 9, wherein the combining step includes the step of starting another line including the at least one character if the at least one character is not appended to the line which includes a previously formed at least one character.

* * * * *